Figure 1:
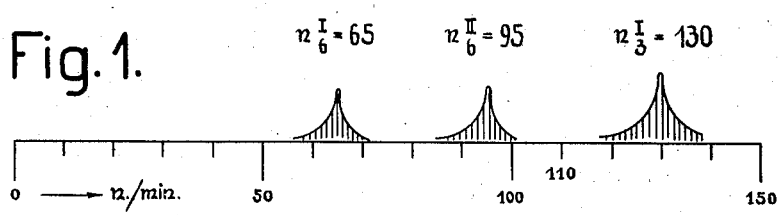

April 20, 1926.

F. SOLTAU 1,581,553

DRIVE FOR SHIPS' PROPELLERS BY MEANS OF INTERNAL COMBUSTION ENGINES

Filed Nov. 8, 1921

Inventor:
Friedrich Soltau,
By Knight Bros.
attys.

Patented Apr. 20, 1926.

1,581,553

UNITED STATES PATENT OFFICE.

FRIEDRICH SOLTAU, OF KIEL, GERMANY, ASSIGNOR TO FRIED. KRUPP AKTIEN-GESELLSCHAFT GERMANIAWERFT, OF KIEL-GAARDEN, GERMANY.

DRIVE FOR SHIPS' PROPELLERS BY MEANS OF INTERNAL-COMBUSTION ENGINES.

Application filed November 8, 1921. Serial No. 513,800.

*To all whom it may concern:*

Be it known that I, FRIEDRICH SOLTAU, residing at Kiel, Germany, a citizen of the German Republic, have invented a certain new and useful Improvement in Drives for Ships' Propellers by Means of Internal-Combustion Engines, of which the following is a specification.

The propeller shafts of ships, which are driven by means of internal combustion engines, are subjected to dangerous resonance phenomena of torsional vibrations, which are produced as soon as the period of the variations of force in the tangential pressure diagram of the engine becomes equal or approximately equal to the period of the natural vibrations of the whole system which substantially comprises the propeller shaft, forming the elastic connection, and the driving gear of the engine, the fly wheel and the propeller forming the vibrating masses. These dangerous speeds of the shaft with which those resonance phenomena occur, are called critical speeds, as is known. According to whether the curve or vibration of the shaft shows one or two or more nodal points, one generally uses the term critical speed of the first ($n^I$), second ($n^{II}$) or higher order. As in every revolution of the shaft a plurality of impulses of vibration is exerted upon it by the driving engine according to the number of cylinders of the latter, the above-mentioned resonance phenomena will occur with speeds amounting to a fraction of the critical speeds $n^I$, $n^{II}$ etc., only, these critical speeds being called critical speeds of the second ($n_2$), third ($n_3$) etc. degree. With a six-cylinder four-stroke motor for instance, as experience and analysis of the tangential pressure diagram proves, the critical speeds of the first order third degree ($n^I_3$) and of the second order sixth degree ($n^{II}_6$) amounting only one third and one sixth, respectively of the speeds $n^I$, $n^{II}$ are found particularly troublesome. Now, as in driving ships by internal combustion engines the critical speeds lie at very low numbers of revolution due to the long elastic propeller shaft, to the heavy masses of the gear parts and to the great number of cylinders of the driving engine, several of these critical speeds generally will fall into the speed range of the engine, since the R. M. P. of ships' engines must be varied over wide limits, and it is in many cases not possible to set the speed range required outside the critical speeds.

By increasing the diameter of the propeller shafts, the critical speed may be slightly raised; this, however, is only true for the critical speed of the first order, whereas the critical speed of the second order, which is often found particularly troublesome, is only slightly influenced thereby.

Attempts have also already been made to keep the ordinary range of the engine free from vibration by changing the critical speeds by the aid of additional centrifugal masses; this however leads to the weight of the set or outfit being increased in an undesirable manner and the set or outfit is rendered more expensive thereby.

The present invention proposes another way for obtaining the ordinary range of the engine free from vibration by removing the critical speeds of the second order from the ordinary range lying between two critical speeds of the first order solely by changing the position of the already existing masses. For this purpose the flywheel of the driving engine or a portion thereof is arranged away from the coupling flange of the engine on the propeller shaft so far towards the rear, that is to say towards the end of the propeller shaft, that the critical speed of the second order of the system lying within the ordinary range of speed of the engine is an integral-multiple of the critical speed of the first order for the system.

The following numerical example, which as nearly as possible corresponds to actual conditions, may illustrate the method more clearly.

A six-cylinder ship's engine coupled to propeller shaft, which normally runs at 110 R. P. M., is to be regulatable without danger between the limits $n=120$ and $n=70$. This system may have a critical speed of the first order $n^I=390$, and a critical speed of the second order of $n^{II}=570$, which would correspond to a typical case. From experience, with this number of cylinders, the critical speeds of the third ($n_3$) and sixth ($n_6$) degree may be very marked which are a third or sixth of the first, second and higher order. For the above case, therefore, danger may lie in the vicinity of $n=65$, $n=130$, and $n=95$ R. P. M., which revolutions correspond to the critical speeds of the first order, sixth ($n^I_6$) and third ($n^I_3$) degree, and of the second order, sixth degree ($n^{II}_6$), whereas the critical speed of the second order, third degree (at $n=190$) would already be outside the ordinary speed range of the engine.

Figure 2:
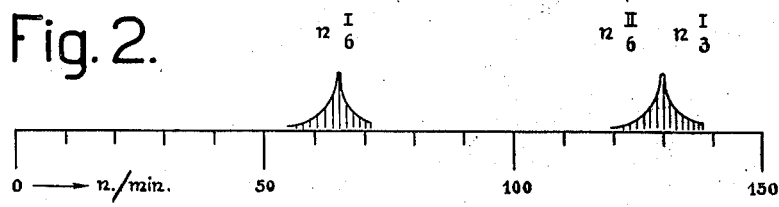
Figure 3:
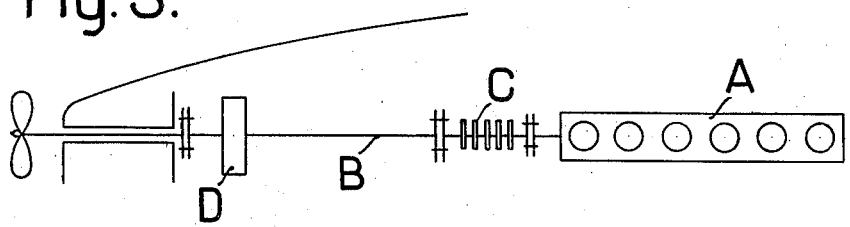
Figure 4:
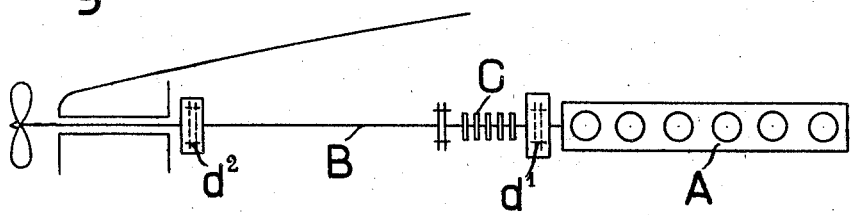

In the accompanying drawing Figs. 1 and 2 are diagrams illustrating the theory underlying the present invention, Fig. 3 shows an embodiment of the invention, and Fig. 4 shows a modification thereof.

In Fig. 1, the ranges, which constitute a danger zone for the system, are shown by graphically superposing the amplitude of the vibrations upon the speeds. Thus the drawing clearly shows that the revolution numbers of the engine when manœuvring between $n=70$, and $n=120$, permanently move through the danger zone (at $n=95$) which is caused by the critical speed of the second order, sixth degree.

It is further seen from the drawing that the range of speed which is free from vibrations is the greatest, if the two critical vibration numbers $n^I_3$ and $n^{II}_6$ coincide. This coincidence of the two critical speeds $n^I_3$ and $n^{II}_6$ is obtained, according to this invention, by the displacement of the flywheel in direction of the propeller or, by displacement in combination with a subdivision of the flywheel. The first method has not previously been used, apparently because by displacing the flywheel in the direction indicated, the two critical speeds $n^I_3$ and $n^{II}_6$, at first recede from each other, whereby nothing is to be attained. Nevertheless, according to this invention, if the flywheel is displaced still farther, the two critical speeds very soon begin to approach each other, and finally coincide. This corresponds to the case when the critical speed $n^{II}_6$ assumes the value of the critical speed $n^I_3$ (Fig. 2), which in ordinary systems occurs when the flywheel is carried as far aft along the farther end of the shaft tunnel, as to be in the immediate vicinity of the stern tube as indicated in Fig. 3, in which A represents the engine, B the propeller shaft, C the thrust bearing, and D the flywheel.

In order to practically determine the position on the propeller shaft to which the flywheel D must be shifted, the designer will have to calculate by well known methods of calculation the individual vibration numbers of the first and second orders for different positions of the flywheel. From the results of this calculation it will then also be found directly how the critical speeds $n^I_3$ and $n^{II}_6$ approach each other more and more with the shifting of the flywheel, until they finally coincide. The flywheel must therefore be placed at this point.

In order to avoid difficulties connected with the placing of large flywheels in the shaft tunnel, the purpose sought may be attained by splitting up the flywheel into two parts $d^1$ and $d^2$, as shown in Fig. 4, one of which is disposed immediately beside the engine in the ordinary manner, and the other beside or attached to the last coupling flange of the propeller shaft. The masses of the two parts $d^1$ $d^2$ of the flywheel, which parts have together the same mass as the undivided flywheel of Fig. 3, must be chosen with such a proportion to each other, that the critical speeds of higher (second) order of the entire system, which lie within the speed range of the engine, become integral multiples of the lowest critical speed of the first order.

The designer will again have to calculate according to known methods of calculation the individual vibration numbers of the first and second orders of the propeller driving mechanism for different positions of the second half $d^2$ of the flywheel, and if necessary for different magnitudes of the ratio $\frac{d^1}{d^2}$. By mathematical interpolation the particular position for the second half $d^2$ of the flywheel in which the condition $n^I_3=n^{II}_6$ is fulfilled, will then be obtained.

According to the number of cylinders, of course, other critical speeds than those of the third and sixth degree occur, for example, in an eight-cylind engine those of the fourth and eighth degree. As, however, the critical speeds of any other stand in an integral relationship to each other, the above method of the invention can be applied to any system without further difficulty. The same holds good for uncommon systems for example, those in which high speed engines are placed amidships, in which case critical speeds of the third or fourth order predominate over those of the first and second order.

Claims:
1. A method of eliminating critical speeds substantially without stiffening the shaft of the driven system consisting in arranging a flywheel on the said shaft at such a distance from the driving motor that the critical speeds substantially disappear.

2. A method of eliminating critical speeds without stiffening the shaft, of the driven system attained by distributing the mass of the flywheel over the shaft in such a manner that such critical speeds substantially disappear.

3. A method of eliminating critical speeds without stiffening the shaft of the driven system attained by distributing the mass of the flywheel upon the shaft in such a manner that such critical speeds substantially disappear, part of said flywheel mass being placed close to the driving motor, the other portion of the flywheel mass being placed remote from the driving motor and the relative masses of the two flywheels being so chosen, that the undesired critical speeds substantially disappear.

4. In combination with engine drives for propeller shafts or the like, comprising a shaft attached to said engine and a flywheel upon the said shaft and remote from said engine said flywheel when placed on said shaft near said engine giving to said shaft a critical speed which lies within the speed range of said engine, and when placed in a distance from the engine or distributed over said shaft substantially removes said critical speed from within the speed range.

5. In combination with internal combustion engine drives for propeller shafts or the like comprising a shaft attached to said engine and a flywheel upon said shaft and remote from said engine at such a distance that the critical speeds of higher (second) order of the system which lie within the speed range of the engine, become integral-multiples of the lowest critical speed of the first order.

6. In combination with engine drives for propeller shafts or the like comprising a shaft attached to said engine and a flywheel upon said shaft near said engine and a second flywheel remote from said engine, said second flywheel when placed near the first flywheel giving to said shaft a critical speed which lies within the speed range of said engine and when placed at a distance from the first flywheel substantially removes said critical speeds from within the speed range of said engine.

7. In combination with internal combustion engine drives for propeller shafts or the like comprising a shaft attached to said engine and a flywheel upon said shaft near said engine and a second flywheel remote from said engine near the tail shaft coupling the relative masses of the flywheels being so chosen, that the critical speeds of higher (second) order of the system, which lie within the speed range of the engine, become integral-multiples of the lowest critical speed of the first order.

The foregoing specification signed at Kiel, Germany, this 27 day of September, 1921.

FRIEDRICH SOLTAU.